June 30, 1925.  
G. H. GIBSON  
FURNACE REGULATION  
Filed March 5, 1923  
1,544,091  
3 Sheets-Sheet 3

INVENTOR  
GEORGE H. GIBSON  
BY John E. Hubbell  
ATTORNEY

Patented June 30, 1925.

1,544,091

UNITED STATES PATENT OFFICE.

GEORGE H. GIBSON, OF MONTCLAIR, NEW JERSEY.

FURNACE REGULATION.

Application filed March 5, 1923. Serial No. 622,391.

*To all whom it may concern:*

Be it known that I, GEORGE H. GIBSON, a citizen of the United States, and resident of Montclair, New Jersey, in the county of Essex and State of New Jersey, have invented certain new and useful Improvements in Furnace Regulation, of which the following is a specification.

The general object of my present invention is to provide improved methods of, and apparatus for regulating combustion in furnaces which are especially devised and adapted for use in regulating the combustion in the boiler furnaces of a power plant comprising a plurality of boiler furnaces.

A specific object of the invention is to provide a reliable and effective control system for a plurality of boiler furnaces which will permit of an easy and accurate regulation of combustion conditions in each boiler furnace of a battery of such furnaces from a common switchboard or control station, and which is flexible to permit the ready maintenance of combustion conditions in one or more furnaces which are different from those maintained in other furnaces of the battery. For example, I advantageously make provisions whereby one or more of the boiler furnaces may be operated under a constant load, while the rate of combustion in each of the other boiler furnaces in service is varied in automatic response to fluctuations in the difference between the total boiler load and the portion of that load carried by the boilers operating at constant load.

Another specific object of the invention is to provide for maintaining a constant or manually regulable rate of combustion in a boiler being heated up and which has not yet attained the working steam pressure, while automatically varying combustion in the boilers then supplying steam in response to the load on those boilers. Another specific object of the invention is to provide improved means for regulating combustion in a furnace heated by the combustion of two fuels, one of which is supplied at a rate which does not vary with, and is ordinarily insufficient to satisfy the entire heat requirements of the furnace, while the other fuel is supplied as required to furnish the additional heat needed. Still another specific object of the invention is to provide combustion regulating provisions especially adapted for use in furnaces heated by the combustion of powdered coal.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described preferred embodiments of my invention.

Figure 1:
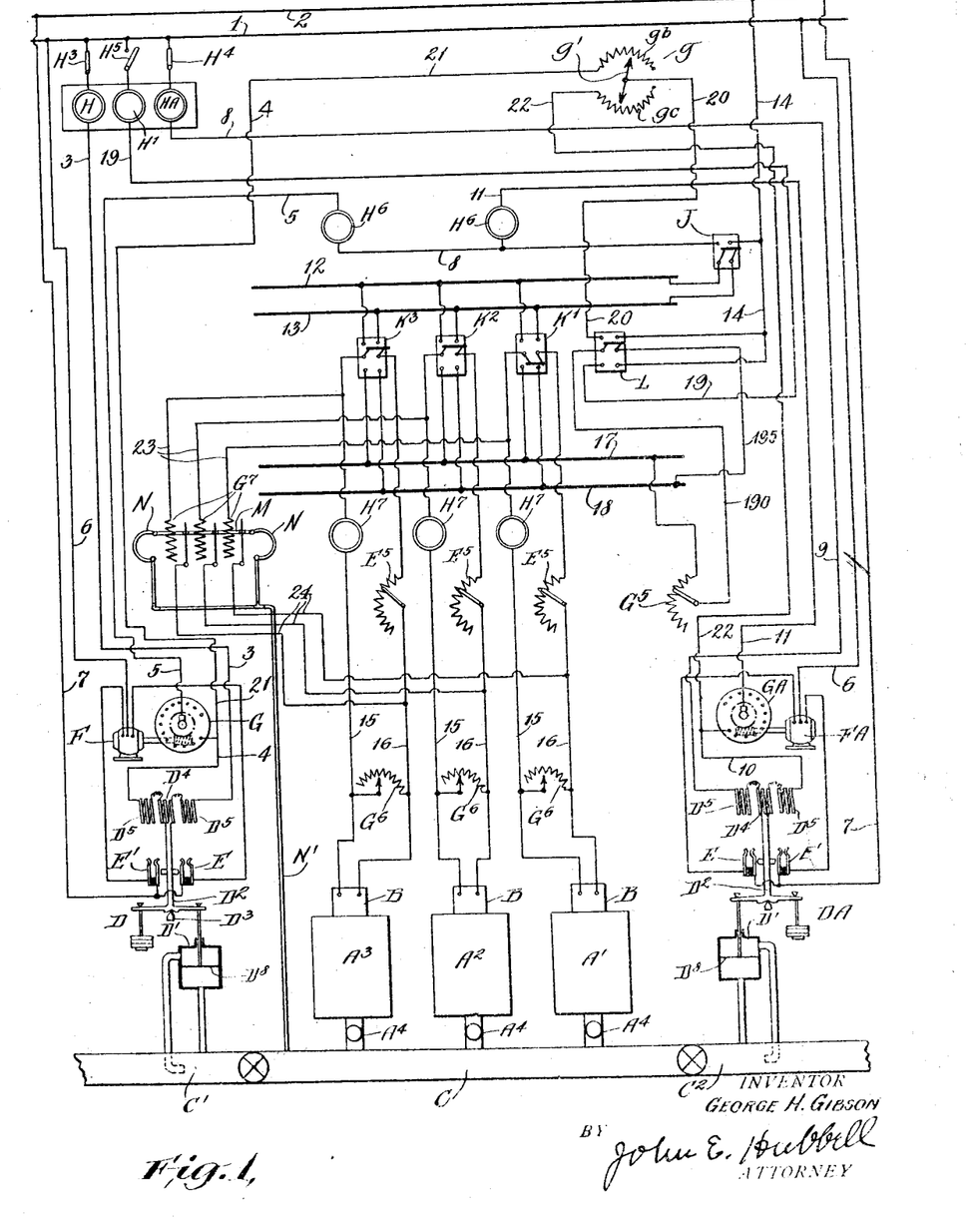
Fig. 1 is a diagrammatic representation of a boiler furnace control system.

In the system diagrammatically illustrated in Fig. 1, each of a plurality of boilers A, A², and A³, has its valved steam outlet A⁴ connected to a common steam main C which supplies steam through separate valved outlets or supply branches C' and C², to different steam using devices. Associated with the steam supply branch C', is a device D which I term a master flow meter, the purpose and effect of which is to maintain an electric control current which is proportional in strength to the rate of steam flow through the supply connection C'. I have devised, in my prior Patent No. 1,463,558, and other patents and applications have disclosed various flow meters suitable for the purpose specified. The flow meter D diagrammatically illustrated herein, comprises a differential pressure gauge D' consisting of two pressure chambers separated by a flexible diaphragm or partition D⁵ connected to a lever D² pivoted at D³, and Pitot tube connections from the supply pipe C' to the interiors of the pressure chambers. With this arrangement the pressure differential on the diaphragm subjects the lever $D^2$ to a rotative impulse in the clockwise direction proportional to the dynamic pressure of the steam flowing through the pipe C'. An opposing force is impressed on the lever $D^2$ by the electromagnetic interaction of a coil $D^4$ carried at the upper end of the lever and stationary coils $D^5$ which are connected in series in an energizing circuit including conductors 3 and 4. This circuit is energized from electric supply conductors or mains 1 and 2, the conductor 3 being connected to the supply conductor 1 through the ammeter H and corresponding switch $H^3$, while the conductor 4 is connected to the supply conductor 2 through connections hereinafter described. By maintaining a constant proportion between the strength of the electric current flowing through the coils $D^4$ and $D^5$, and the rate of steam flow through the outlet C, the balance lever $D^2$ may be kept in neutral position, since the forces exerted on the lever by the current and the steam flow are proportional, respectively, to the square of current strength and to the square of the rate of steam flow.

The electric control current flowing through the coils $D^4$ and $D^5$ is automatically adjusted by the meter D to maintain the desired ratio between its strength and the rate of steam flow, by means of a rheostat G to which the conductor 4 is connected. The rheostat is adjusted to vary the resistance interposed between the conductor 4 and a conductor 5 by a reversible motor F. The latter has one terminal connected to the supply conductor 1 through the conductor 6, and has two other terminals, one connected to a switch E and the other to a switch E'. The switches E and E' are so arranged that in the neutral position of the lever $D^2$, each switch is open, but when the left hand end of the lever is raised or lowered, the switch E or the switch E', respectively, is thereby closed, and each of these switches, when closed, connects a corresponding terminal of the motor F to the supply conductor 2 through the branch conductor 7.

When the switch E is closed, the motor F rotates in the direction to decrease the portion of the resistance of the rheostat G in circuit with the coils $D^4$ and $D^5$, and thereby increases the electric current flow through those coils, and when the switch E' is closed, the motor F is started into operation in the direction to increase the amount of resistance in circuit with the coils $D^4$ and $D^5$, and thereby decrease the current flow through the latter, the result in each case being to restore the lever $D^2$ to its neutral position. The conductor 5 is connected through an ammeter $H^6$ to a conductor 8 which runs to one terminal of the switch J.

Associated with the steam supply branch $C^2$, is a master flow meter DA which may be exactly similar in construction and operation to the flow meter D. The coils $D^4$ and $D^5$ of the meter DA are connected to the supply conductor 1 by a conductor 9, ammeter HA and switch $H^4$, and are connected to the conductor 8 by a conductor 10, ammeter $H^5$, rheostat GA and conductor 11. The rheostat GA is similar to the rheostat G and is operated by a motor FA similar to the motor F, and similarly controlled.

The switch J, when closed, connects the conductor 8 and thereby the conductors 5 and 11 to a bus bar or distributing conductor 12, and at the same time connects a cooperating bus bar 13 through a branch conductor 14 to the supply conductor 2. K', $K^2$ and $K^3$ represent double throw switches, one for each of the boilers A', $A^2$ and $A^3$, and each serving when its switch blades are in their upper closed position, to connect the bus bars 12 and 13 through conductors 15 and 16, respectively, to the terminals of the combustion control mechanism B associated with the corresponding boiler.

The purpose and effect of each device B is to make one or more of the factors controlling combustion in the corresponding boiler furnace vary in proportion to the strength of the electric current flowing through the corresponding conductors 15 and 16. The factors which may thus be controlled include the rate of fuel supply, the rate at which air for the combustion of the fuel is supplied, the rate at which products of combustion are withdrawn and the combustion chamber pressure. In my above mentioned Patent 1,166,758, I have illustrated one means which may be employed for thus varying the supply of air to support combustion, and in my copending application, Serial No. 121,547, filed September 22, 1916, I have illustrated other arrangements for making a number of the combustion control factors vary in proportion to the strength of an electric current control force, and in Fig. 2 hereof, I illustrate provisions for regulating various combustion controlling factors. Advantageously, I include in circuit with each pair of conductors 15 and 16, an individual manually adjustably resistance $E^5$, and an individual ammeter $H^7$, and preferably a manually adjustable resistance $G^6$ is connected in shunt to each mechanism B.

With the switch J closed, and one or more of the three switches K', $K^2$ and $K^3$ in the position in which they connect the terminals of the corresponding control mechanism B to the bus bars 12 and 13, and if the hereinafter mentioned switch L is not in its upper closed position, the aggregate of the currents flowing between the bus bars 12 and 13 through the conductors 15 and 16 connected thereto will be proportional to the aggregate rate of steam flow through the main C through its outlets C' and C². By manipulating the appropriate resistances E⁵ and G⁶, the current flow between the bus bars 12 and 13 may be divided among the different sets of local control conductors 15 and 16 in any desired ratio. For instance, if all three of the switches K', K² and K³ have their blades in their upper closed position, equal current flows through the three control mechanisms B may be maintained, or different rates of current flow through all three mechanisms B may be maintained, or equal current flows may be maintained through two of the mechanisms B and a different current flow maintained through the third mechanism B. If the three boiler furnaces and their control mechanisms B are all similar in design and proportion, which may or may not be the case, when the control currents flowing through any two mechanisms B are equal, the two boiler furnaces will be operated at the same rating, and will carry the same load. If the boilers are of different nominal ratings, but are provided with similar control mechanisms B, the control currents which flow through those mechanisms must be different, of course, to operate the two boilers each at the same per cent of its nominal rating.

To permit the operation of one or more of the boiler furnaces A', A² and A³, at a rate which does not fluctuate with the rate at which steam is supplied through the branches C' and C², I provide a second set of bus bars 17 and 18 which I call the steady load bus bars, to distinguish them from the bus bars 12 and 13, which I call the variable load bus bars. The conductors 15 and 16 running to any control mechanism B may be respectively connected to the bus bars 17 and 18, by throwing the blades of the corresponding switch K' K² or K³ into their lower closed position. The bus bars 17 and 18 are connected by conductors 190 and 195, respectively, to the blades of a double throw switch L, which I call the steady load switch. Advantageously one of these conductors includes a rheostat G⁸ as shown. The switch L in the lower closed position of its blades connects the bus bar 17 to the supply conductor 1 through conductors 19 and 190, and preferably through an ammeter H', and in its other closed position the switch connects the bus bar 17 to the conductor 1 through a conductor 20, a device g, which I call a meter load adjuster, and the conductors 4 and 10. As shown the device g includes a switch lever g' to which the conductor 20 is connected. The lever g engages resistances g^b and g^c connected, respectively, by conductors 21 and 22 to the conductors 4 and 10, the arrangement being such that as the lever g' is angularly adjusted the portion of the resistance g^b in circuit is increased, or decreased, and while the portion of the resistance g^c in circuit is decreased or increased. In each of its closed positions the switch L serves to connect the bus bar 18 to the supply conductor 2 through the conductor 14.

With the switch blades of the switch L in their upper closed position, and with the blades of the switch K in its lower position, and with the blades of the switches K² and K³ in their upper closed position, for example, the boiler A' will operate with a constant rate of combustion, while the rate of combustion in the boilers A² and A³ will vary in proportion to the variations in the difference between the total amount of steam supplied through the connections C' and C², and the amount which should be generated by the boiler A'. This follows from the fact that while the current flow to the regulating mechanism B of the boiler A' energized from the steady load bus bars 17 and 18, depends on the adjustment of the manually controlled rheostats gb, gc, and G⁵ and on the adjustment of the resistances E⁵ and G⁶ in its local control circuit, it is not affected by the adjustments of the flow meter rheostats G and GA. Inasmuch, however, as the current passing through the control mechanism B energized from the steady load bus bars 17 and 18 comes partly through the coils of the master flow balance D, and partly through the coils of the master flow DA, the sum of the currents flowing through the rheostats G and GA and the variable load bus bars 12 and 13 will then not be proportional to the total rate of steam generation, but to the amount by which the total rate of steam generation exceeds the amount of steam generated by the boiler A', when operating with the rate of combustion provided for.

While one or more of the boilers A', A² and A³ are being energized from the steady load bus bars 17 and 18, and one or more are being energized from the variable load bus bars 12 and 13, if the total demand for steam falls below the output of the boilers controlled by the steady load bus bars, one or more of the boilers controlled from the steady load bus bars should be disconnected from the latter, and thrown over onto the variable load bus bars to avoid the generation of steam in excess of the demand. The meter load adjuster g is provided to vary the respective portions of the current supplied to the constant load bus bars through the coils of the two master flow meters D and DA. This is desirable where the relative amounts of steam outflow through the connections C' and C² vary from time to time, for if not provided, under some conditions the steady load bus bars might draw more current through the coils of the flow meters D and DA connected to the outlet C' or C² through which the smaller steam flow then passes, than would be required to balance the lever D² of the corresponding flow meter D or DA even with the corresponding rheostat G or GA adjusted to offer the maximum resistance possible to current flow therethrough.

With the blades of the switch L thrown into their lower closed position, the steady load bus bars 17 and 18 are directly energized from the supply conductors 1 and 2 through the conductors 14 and 19. This condition of the control circuits may be desirable in heating a boiler up, preparatory to putting it into operation, such boiler being then connected to the steady load bus bars, while the boilers already in service are then controlled from the variable load bus bars 12 and 13. While the one boiler is thus being fired up, a constant rate of combustion will be maintained therein, save as the rate of combustion may be varied by manipulation of the resistances G⁵ and the appropriate resistances E⁵ and G⁶. It is possible also to operate all of the boilers in service from the steady load bus bars 17 and 18, with the switch L in either closed position. In such case the balances D and DA are inoperative, and I ordinarily then prefer to open the switch J and throw the switch L into its upper closed position.

The apparatus shown in Fig. 1 comprises provisions whereby the rate of combustion in any boiler whether controlled from the bus bars 12 and 13, or from the bus bars 17 and 18, be automatically increased or decreased in case the boiler steam pressure decreases or rises above the predetermined normal steam pressure. The provisions shown in Fig. 1 for this purpose, comprise means for varying the electric current passing to the control mechanism B of each boiler from the bus bars 12 and 13, or 17 and 18 to which the mechanism is connected, in response to variations in the steam pressure. The provisions shown for this purpose comprise shunt circuits, each including a conductor 23, a conductor 24, and more or less of a corresponding resistance G⁷, connected one across the conductors 15 and 16 running to each combustion control mechanism B. The amount of each of the resistances G⁷ thus connected at any instant in shunt about the corresponding mechanism B, is decreased or increased as the steam pressure rises and falls, by means of a contact plate M to which the conductors 24 are connected and which is carried by the free ends of a pair of Bourdon tubes N to which the steam pressure is transmitted through the pipe N'. This special construction is not claimed specifically herein as it is disclosed and claimed in my copending application, Serial No. 499,403, filed September 9, 1921. It will be obvious to those skilled in the art that the variable resistances G⁷ may each be connected in series with the corresponding conductors 15 and 16 instead of in the shunt thereto as illustrated, but when connected in series, the portions of resistances G⁷ in circuit should decrease and increase as the steam pressure decreases and increases.

With the apparatus shown in Fig. 1, the boilers having their combustion regulating devices B connected to the steady load bus bars 17 and 18, will have their rates of combustion automatically increased and decreased as the steam pressure falls and rises above normal, and with suitably designed apparatus, a very effective control of the rate of combustion may be had in this manner. In general, when the only automatic control of the rate of combustion is in response to steam pressure, as it would be when operating with the switch J open as above described, the pipe N' should be connected to the steam main at some distance from the boilers so that the pressure would be a compound function of the pressure at the boilers, and the drop in pressure between the boilers and the point of connection so that said drop in pressure would increase or decrease with the rate of steam flow.

Those skilled in the art will understand that the control system diagrammatically illustrated in Fig. 1 is well adapted for its intended purpose of accurately regulating combustion conditions in each of a battery of boiler furnaces from a single switchboard or control station. The various meters provided make it possible to observe and if these meters are recording meters, to record the performance of each individual boiler. The flexibility of the control system permits of any desired change in operating conditions. For example, it permits of changes at will in combustion conditions in the battery as a whole, or in any individual boiler furnaces which may be desired in practice. If one of the steam outlets C' and C² is closed, and the corresponding flow balance D or DA is thereby rendered inoperative, no change in the control system as a whole would be required, save possibly an adjustment of the switch lever g', and an adjustment of the rheostat G⁸.

In the case of any boiler having its control mechanism B energized from the steady load bus bars 17 and 18, the control of the rate of combustion in the boiler must be purely manual, save as it is modified by the control provisions responsive to steam pressure, which may be dispensed with in some cases; while a boiler rate of combustion is thus under manual control, combustion conditions in the boiler will nevertheless be automatically controlled if the mechanism B employed comprises known or suitable provisions for automatically proportioning the rates of air and fuel supply, furnace pressure conditions or other combustion control factors. This readily appears, for example, from a consideration of the specific form of control provisions illustrated diagrammatically in Fig. 2.

Figure 2:
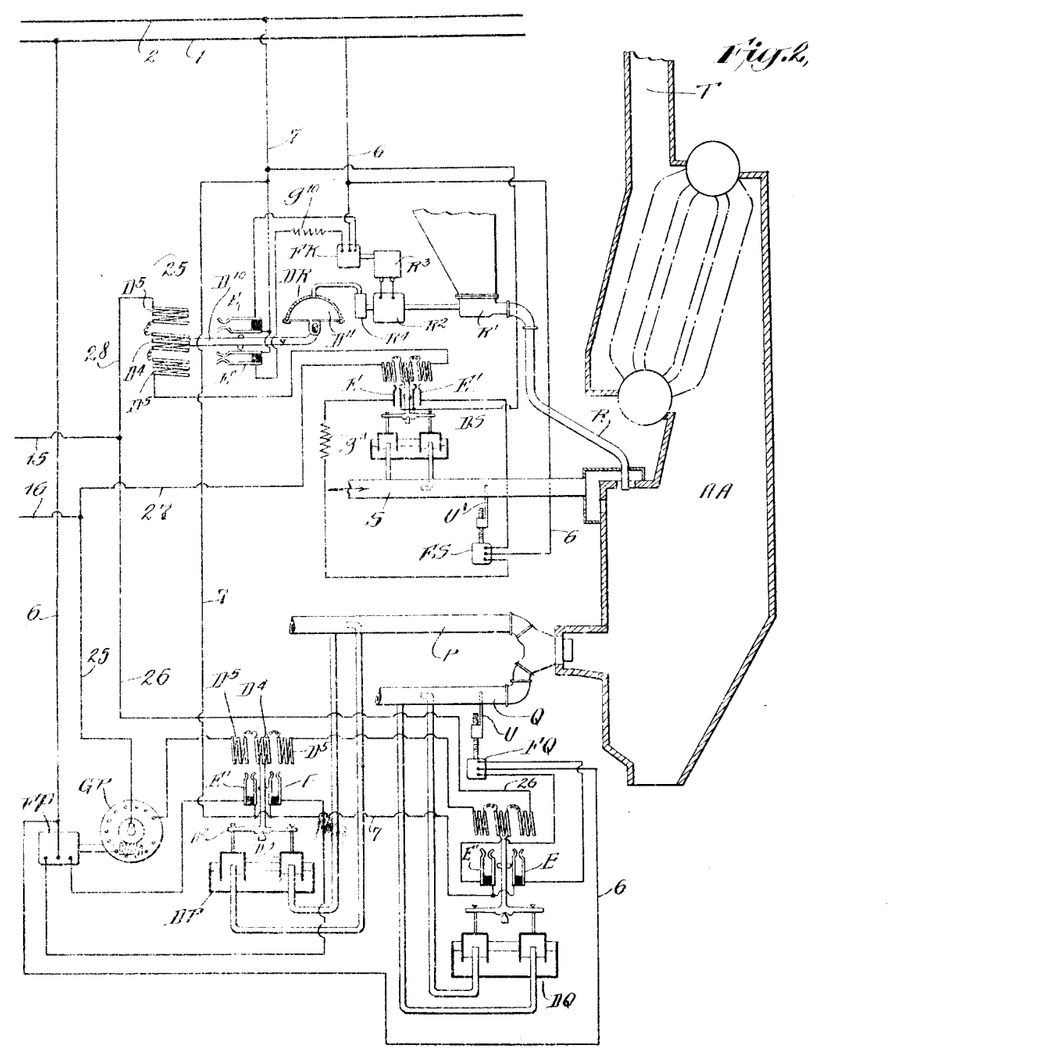
Fig. 2 is a diagrammatic representation of special combustion regulating provisions for a boiler furnace heated by the combustion of relatively variable amounts of two fuels.

In the apparatus illustrated diagrammatically in Fig. 2, AA represents a boiler furnace adapted to be heated partly by the combustion of one fuel, as blast furnace gas, supplied through the conduit P at a rate which does not vary with the heat requirement of the furnace and which is insufficient to fully supply those requirements; and partly by the combustion of another fuel, as powdered coal, which is supplied through a conduit R as required to furnish the additional heat needed. Associated with the furnace AA are control provisions for regulating the feed of powdered coal and of the air required for the combustion of the powdered coal and gas, which provisions, collectively, may be regarded as corresponding to one of the control mechanisms B of Fig. 1, and are adapted to be energized and controlled by a corresponding pair of the local control conductors 15 and 16 of Fig. 1.

The control provisions shown in Fig. 2 comprise flow balances DP, DQ, and DS, and a special balance DR, and other parts and circuit connections hereinafter referred to. The flow balance DP may be identical in construction with the master flow balances D and DA of Fig. 1, but preferably comprises a different type of differential pressure gauge, such as that shown in which a bell $D^a$ dipping in a sealing liquid is suspended from each arm of the lever $D^2$. The balance DP operates through a rheostat $D^p$ and its reversible actuating motor FP, to maintain a current flow through the circuit portion including the coils $D^4$ and $D^5$ of the balance DP and DQ, and conductors 25 and 26 which is proportional to the rate of gas flow to the furnace through the conduit P. This circuit portion is connected between the control conductors 15 and 16. The flow balance DQ, which is similar in construction to the balance DP operates through the reversible motor FQ to open and close a valve or damper U in an air supply conduit Q as required to make the flow of air to the furnace through that conduit proportional to the gas flow through the conduit P. The portion of the current flow between the conductors 15 and 16 which does not pass through the coils of the balances DP and DQ, passes through a circuit portion comprising conductors 27 and 28 and the balance coils $D^4$ and $D^5$ of a flow balance DS and of a special balance DR.

The balance DS, which may be identical in construction and general purpose with the balance DP, acts through the reversible motor FS to adjust a damper U′ in the air supply conduit S as required to make the rate at which air is supplied to the furnace by the conduit S, proportional to the strength of the electric control current passing through the coils of the balance.

The purpose of the special balance DR is to make the rate at which powdered fuel is supplied to the furnace through the conduit R, proportional to the strength of the electric current flowing through the coils $D^4$ and $D^5$ of the balance. The balance DR differs from the various flow balances in that the balance lever $D^{10}$ which carries the floating coil $D^4$, is not acted on by a differential pressure gauge, but by the diaphragm or flexible wall portion of a pressure chamber $D^{11}$, in which a pressure is maintained which is proportional to the square of the rate at which powdered coal is passed into the furnace through the conduit R. For this purpose the motor $R^2$ which operates the powdered coal feeding device R′, also operates a small compressor $R^4$ which has its outlet connected to the chamber $D^{11}$, and thus maintains a pressure in the latter proportional to the square of the speed of the motor $R^2$. The speed of the motor $R^2$ is regulated by a controller $R^3$ which is adjusted by a reversible motor FR. The motor FR is directly controlled by the balance lever $D^{10}$ through its switches E and E′, and acts to speed up the motor $R^2$, or to slow it down as required to maintain a balance between the force exerted on the lever $D^{10}$ by the electromagnetic interaction of the coils $D^4$ and $D^5$, and the force exerted on the lever by the flexible wall or diaphragm of the pressure chamber $D^{11}$. The various reversible motors FP, FQ, FR and FS may be similar in construction and mode of operation to the motor F associated with the master flow controller D, and the two energizing conductor connections from the supply conductors 1 and 2 to each of these motors are designated by the symbols 6 and 7.

Figure 4:
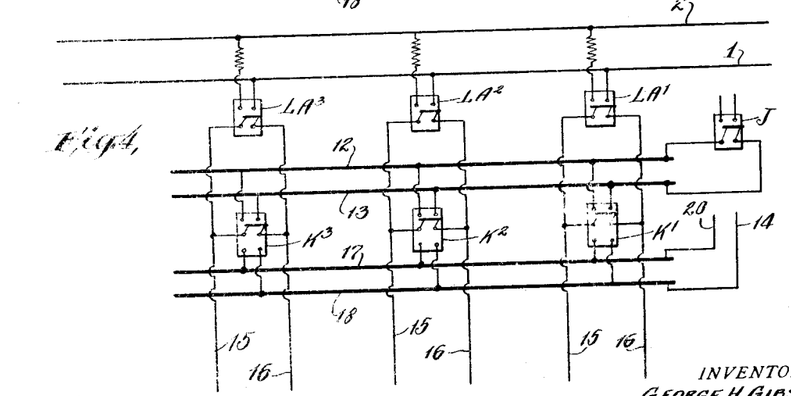
Fig. 4 is a diagram illustrating another modification of the control system shown in Fig. 1.

It will be understood that in the contemplated mode of operation of the apparatus shown in Fig. 2, the total current flowing through the conductors 15 and 16 is a measure of the rate at which heat is to be supplied to the boiler furnace AA, and may be supplied from the bus bars 12 and 13, or from the bus bars 17 and 18, or directly from the supply conductors 1 and 2, through the conductors 19 and 14 of Fig. 1, or in the manner illustrated in Fig. 4. The flow balance Dp, through the rheostat GP controlled by it, divides the total current into two portions, one of which varies with the rate of gas flow through the gas supply conduit P, and through the balance DQ controls the supply of air for combustion of the gas passing to the furnace through the conduit Q. The other portion of the control current acts through the balances DR and DS to supply powdered coal and air for its combustion, as required to supply whatever heat is needed in addition to that furnished by the combustion of the gas supplied by the conduit P, to make the total heat supplied to the furnace proportional to the total control current flowing through the conductors 15 and 16.

To avoid unfavorable combustion conditions and the possibility of explosions in a furnace heated by the combustion of powdered coal, it is desirable on any increase in the rate of combustion to increase the supply of air supporting combustion at a rate more rapid than the rate at which the supply of powdered coal is increased. This result is obtained with the apparatus shown in Fig. 2 by the simple expedient of providing a resistance $q^{10}$ in that energizing circuit of the motor FR, which acts when closed to sped up the motor $R^2$. The effect of this is to retard the speeding up of the motor $R^2$ on an increase in the control current flowing through the coils of the balances DR and DS as compared with the rate at which the motor FS increases the rate of air supply by adjusting the damper U'. If it is also desired to retard the rate at which the supply of air is diminished, in comparison with the rate at which the motor $R^2$ is slowed down, on a decrease in the current passing through the balances DR and DS, that result may be obtained by placing a resistance $q^{11}$, as shown, in that energizing circuit of the motor FS which is closed to bring about a closing movement of the damper U'.

It will be understood, of course, that in lieu of the special external resistances $q^{10}$ and $q^{11}$, the different windings of the motors FR and FS may be specially formed or proportioned to retard the acceleration of each motor in the one direction in which its motion should be retarded to increase the air to fuel ratio during periods in which the rate of fuel supply is being varied.

Instead of utilizing master flow balances such as the balances D and DA, to maintain a control force varying with the total load on the various boiler furnaces, other means for creating a control force proportional to the total load may be employed. For example, as illustrated in Fig. 3, when all or approximately all of the steam generated is used in driving a prime mover or prime movers operating electrical generators, the electrical energy generated is an approximate measure of the boiler furnace load, and may be utilized to create a control force for operating a control system such as that illustrated in Fig. 1, and in Fig. 3 I have illustrated an arrangement of this sort.

Figure 3:
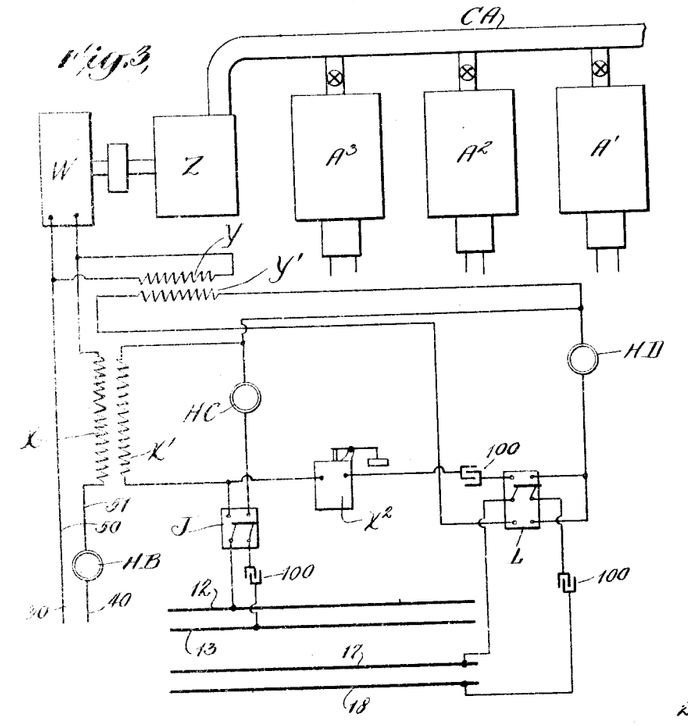
Fig. 3 is a diagram illustrating a modification of a portion of the control system illustrated in Fig. 1.

In Fig. 3 the boiler furnaces A', $A^2$ and $A^3$ are all shown as delivering steam through a common steam main CA, to a turbine Z driving an alternator W furnishing current to the supply conductors 30 and 40. Included in series with the supply conductors 40 is the primary coil X of a current transformer, the secondary coil X', of which is connected to terminals of the switch J, and when the latter is closed, supplies current to the variable load bus bars 12 and 13. The primary winding Y of a constant potential transformer is connected across the conductors 30 and 40, and the secondary winding Y' of this transformer is connected to the terminals of the steady load switch L, so that when the blades of the switch L are in their lower closed position, the steady load bus bars 17 and 18 are directly connected to the terminals of the secondary winding Y', while when the blades of the switch L are in their upper closed position the bus bars 17 and 18 are connected to the terminals of the secondary coil X' of the constant current transformer, in series with a current regulator $X^2$ of any usual or suitable form for maintaining a constant rate of current flow to the bus bars 17 and 18 from the secondary coil X'. In consequence, when the switch blades of the switch L are in their upper closed position, and the switch J is closed, the current supplied to the variable load bus bars 12 and 13 will be less than the current which would be supplied to those bus bars if the switch L were open, or had its blades in their lower closed position, by the amount of current then being supplied to the steady load bus bars 17 and 18. Associated with the control system shown in Fig. 3 are ammeters HB, HC and HD for showing the current flow in different portions of the control system and advantageously condensers 100 are provided for maintaining a proper power factor in the control system. The specific form of my invention illustrated in Fig. 3 forms the subject matter of my divisional application Serial No. 728,344, filed July 26, 1924.

In the arrangement specifically illustrated in Fig. 1, when the blades of the switch L are in their lower closed position, and the steady load bus bars 17 and 18 are then utilized in bringing one or more boilers up to the working pressure, it is not possible to operate any of the boilers then in service under constant load. When, as may be desirable in some large stations having many boilers operated from the same control system it may be desirable to operate one or more boilers at constant load while simultaneously other boilers as required to supply the balance of the plant steam requirements, and at the same time maintaining a steady rate of combustion in one or more boilers being heated up and not yet delivering steam, I may advantageously employ the modification shown in Fig. 4.

The apparatus shown in Fig. 4 differs from that shown in Fig. 1, in that the steady load switch L is dispensed with, and the steady load bus bar 17 and 18 are constantly energized by direct connection to the conductors 20 and 14, respectively, of Fig. 1. Associated with the local control circuit conductors 15 and 16 of each of the different boiler furnaces is a corresponding switch LA', LA² and LA³, by which the conductors 15 and 16 running to the control mechanism of any one of the different boiler furnaces A', A² and A³ may be connected directly to the supply conductors 1 and 2. With this arrangement, for example, if the switches LA², LA³ and K' are open, and the switch LA' closed, and the switch K² has its blades in their upper closed position, and the switch K³ has its blades in their lower closed position, a steady rate of combustion will be maintained in the boiler furnace A' as required to heat up that boiler furnace preparatory to putting it into service, the boiler furnace A³ will operate under constant load, and the boiler furnace A² will operate under a rate of combustion varying with the difference between the total load and the portion of the load carried by the boiler furnace A³.

While in accordance with the provisions of the statutes I have illustrated and described the best forms of my present invention now known to me, it will be apparent to those skilled in the art that changes may be made in the form of my invention without departing from the spirit of my invention as set forth in the appended claims, and that certain features of my invention may sometimes be used to advantage without a corresponding use of other features.

Having now described my invention, what I claim as new and desire to secure by Letters Patent, is:

1. The method of automatically regulating combustion in a plurality of boiler furnaces supplying steam to a common distributing system having a plurality of outlets, which consists in establishing a control force proportional to the steam flow through each of said outlets, and varying the aggregate rate of combustion in said boiler furnaces in response to variations in the sum of said control forces.

2. The method of regulating combustion in a battery of boiler furnaces which consists in maintaining a control force proportional to the total boiler load, dividing said control force into portions one of which is a constant quantity, utilizing said constant quantity to maintain a steady rate of combustion in one or more of the boiler furnaces, and utilizing the other portion of the control force to maintain a rate of combustion in the other boiler furnaces which varies with the portion of the total boiler load not borne by the boilers operating with a steady rate of combustion.

3. In the method of claim 1, the further step which consists in varying the rate of combustion in the various boiler furnaces in inverse response to changes in the pressure of the steam generated.

4. The method of automatically regulating combustion in a furnace heated by the combustion of fuel supplied from two separate sources, which consists in creating a control force proportional to the total rate of heat generation desired in the furnace, diminishing said force by an amount proportional to the rate at which fuel is supplied from one of said sources, and utilizing the remaining portion of said force to regulate the supply of fuel from the other source.

5. The method of operating a furnace heated by the combustion of powdered fuel which consists in automatically maintaining a predetermined ratio between the rates at which the powdered fuel and air for its combustion are supplied to the furnace during periods in which the rate of fuel supply is substantially uniform, and automatically increasing the ratio of air to fuel supply during periods in which the rate of fuel supply is changing.

6. The method of operating a furnace heated by the combustion of powdered fuel which consists in automatically maintaining a predetermined ratio between the rates at which the powdered fuel and air for its combustion are supplied to the furnace during periods in which the rate of fuel supply is substantially uniform, and automatically increasing the ratio of air to fuel during periods in which the rate of fuel supply is being increased.

7. The combination with a battery of boiler furnaces and a separate electrical control mechanism for each furnace for regulating combustion conditions therein, of an electrical control system comprising steady load bus bars, variable load bus bars, provisions for optionally connecting each of said mechanisms to the steady load bus bars or to the variable load bus bars, means for maintaining a constant potential difference between the steady load bus bars, and means for maintaining a potential difference between the variable load bus bars varying automatically with the difference between the total boiler load, and the portion of that load borne by the boilers operating from the steady load bus bars.

8. The combination with a battery of boiler furnaces and an electrically controlled combustion regulating mechanism for each boiler, of a control system comprising one or more electric flow balances responsive to the steam output of said furnaces, means for passing a constant balancing current through said balances to each of one or more of said control mechanisms to maintain a constant rate of combustion in the corresponding boiler furnace or furnaces, and means automatically adjusted by the balances for passing a current through said balances to the control mechanisms of the other furnaces, which varies as required to make the total current flow through the balances proportional to the total steam generation of the boiler furnaces.

9. The combination with a battery of boiler furnaces and a separate control mechanism for each furnace for regulating combustion conditions therein, of provisions controlling some of said mechanisms as required to maintain constant rates of combustion in the corresponding furnaces, and provisions controlling other mechanisms as required to make the corresponding boiler furnaces operate with a rate of combustion proportional to the difference between the total boiler furnace load and the portion of that load borne by the boilers controlled by the first mentioned provisions.

10. The combination with a battery of boiler furnaces and a separate control mechanism for each furnace for regulating combustion conditions therein, of provisions controlling said mechanisms as required to maintain constant rates of combustion in the corresponding furnaces, provisions for controlling said mechanisms as required to make the corresponding boiler furnaces operate with rates of combustion proportional to the difference between the total boiler furnace load and the portion of that load borne by such of the boilers as are then controlled by the first mentioned provisions, and means for optionally subjecting each of said mechanisms to the control of either of said provisions.

11. The combination with a battery of boiler furnaces and a separate electrical control mechanism for each furnace for regulating the combustion conditions therein, of an electrical control system comprising variable load bus bars, steady load bus bars, switch mechanism for optionally connecting each of said control mechanisms to the supply conductors, to the variable load bus bars or to the steady load bus bars, means for maintaining a potential difference between the variable load bus bars proportional to the total load on the boilers controlled from the variable load bus bars and means for maintaining a constant potential difference between the steady load bus bars.

12. The combination with a battery of boiler furnaces and a separate electrical control mechanism for each furnace for regulating the combustion conditions therein, of an electrical control system comprising supply conductors, variable load bus bars, steady load bus bars, switch mechanism for optionally connecting each of said control mechanisms to the supply conductors, to the variable load bus bars, or to the steady load bus bars, means for maintaining an electrical control current flow proportional to the total load on the boilers, and means for passing a constant portion of the control current flow through the steady load bus bars to the mechanism connected thereto, and for passing the remainder of the current flow through the variable load bus bars to the mechanism connected thereto.

13. The combination with a plurality of boiler furnaces supplying steam to a common distributing system provided with a plurality of steam outlets, of means associated with each outlet for maintaining an electric current flow proportional in strength to the steam flow through said outlet, and means responsive to the aggregate strength of said control currents for varying the aggregate boiler furnace rate of combustion in proportion to said aggregate strength.

14. The combination with a plurality of boiler furnaces supplying steam to a common distributing system having a plurality of outlets, of means associated with each outlet for maintaining a control force proportional in strength to the steam flow through said outlet, and means actuated by said forces for varying the aggregate boiler furnace rate of combustion in proportion to the sum of said forces.

15. The combination with a furnace heated by the combustion of powdered coal, of means responsive to the rate at which powdered coal is supplied to the furnace, means responsive to the rate at which air for the combustion of the coal is supplied to the furnace, and control provisions actuated by said means and tending to maintain a constant ratio of air to coal supplied when the rate of coal supply is approximately constant and to increase said ratio during periods in which the rate of coal supply is increasing.

16. The combination with a furnace heated by the combustion of powdered coal, of means responsive to the rate at which powdered coal is supplied to the furnace, means responsive to the rate at which air for the combustion of the coal is supplied to the furnace, and control provisions actuated by said means and tending to maintain a constant ratio of air to coal supplied when the rate of coal supply is approximately constant and to increase said ratio during periods in which the rate of coal supply is varying.

17. In the method of claim 2, the further step which consists in varying the rate of combustion in the various boiler furnaces in inverse response to changes in the pressure of the steam generated.

Signed at New York, in the county of New York and State of New York, this first day of March A. D. 1923.

GEORGE H. GIBSON.